April 27, 1965   J. M. WEST ETAL   3,180,802
BOILING WATER NUCLEAR REACTOR SYSTEM
Filed Dec. 20, 1960   3 Sheets-Sheet 1

INVENTORs:
JOHN M. WEST
STERLING J. WEEMS
BY
Eldon H. Luther
ATTORNEY

April 27, 1965  J. M. WEST ETAL  3,180,802
BOILING WATER NUCLEAR REACTOR SYSTEM
Filed Dec. 20, 1960  3 Sheets-Sheet 2

INVENTORs:
JOHN M. WEST
STERLING J. WEEMS
BY
Eldon H. Luther
ATTORNEY

April 27, 1965　　J. M. WEST ETAL　　3,180,802
BOILING WATER NUCLEAR REACTOR SYSTEM
Filed Dec. 20, 1960　　3 Sheets-Sheet 3

INVENTORs:
JOHN M. WEST
STERLING J. WEEMS
BY Eldon H. Luther
ATTORNEY

United States Patent Office 3,180,802
Patented Apr. 27, 1965

3,180,802
BOILING WATER NUCLEAR REACTOR
SYSTEM
John M. West, Dunedin, and Sterling J. Weems, Safety Harbor, Fla., assignors, by mesne assignments, to Combustion Engineering, Inc., a stock corporation of Delaware
Filed Dec. 20, 1960, Ser. No. 77,185
18 Claims. (Cl. 176—54)

This system relates generally to nuclear reactors and has particular relation to an improved nuclear reactor system of the type wherein boiling takes place within the core of the reactor and with the vapor thus produced being utilized either directly or indirectly in any desired manner such as the generation of power by means of a turbine-generator unit.

Boiling water reactors may employ either a natural circulation system or a forced circulation system for circulating the coolant through the reactor core. Generally in small reactors natural circulation is quite satisfactory and since it has desired economic advantages it is preferred in these reactors. However as the power output of the reactor increases natural circulation creates progressively more of a problem insofar as adequate cooling of the core is concerned with it being necessary to make compromises in the core design and other changes such as employing larger pressure vessels, lowering the specific power of the reactor, having longer exposure of fuel to corrosion, have a lower conversion ratio, provide more shielding and other relatively costly requirements in order to avoid the employment of forced circulation pumps and loops. Accordingly for other than small reactors a natural circulation system for the entire reactor core is neither the most desirable nor economical. However the power density in the core of a boiling water reactor is not uniform throughout the transverse cross section thereof but is substantially greater in the central region than in the outer region. Accordingly while the point may be reached where forced circulation is desirable for the center region, in order that compromises in design and the like to assure adequate cooling need not be employed, the outer core region may be adequately cooled by a natural circulation system. Under these circumstances a circulation may be provided which is multipass in nature and which substantially reduces the amount of water that needs to be handled by the forced circulation pump as compared with a conventional force circulation arrangement and still assure that adequate cooling is produced.

The present invention is directed to a boiling water nuclear reactor system wherein the reactor core is divided or partitioned into a number of flow passages from the center of the core outwardly and with the circulation system being such that a more positive circulation is provided through the central core region than through the outer core regions with a pump being employed to force the water through the central core region. The invention, in this respect, is a furtherance of the invention described and claimed in copending application Serial No. 845,531, filed October 9, 1959, with the organization of the present invention providing an economic construction for achieving these desired results.

Accordingly it is an object of this invention to provide an improved boiling water reactor system.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein.

Figure 1:
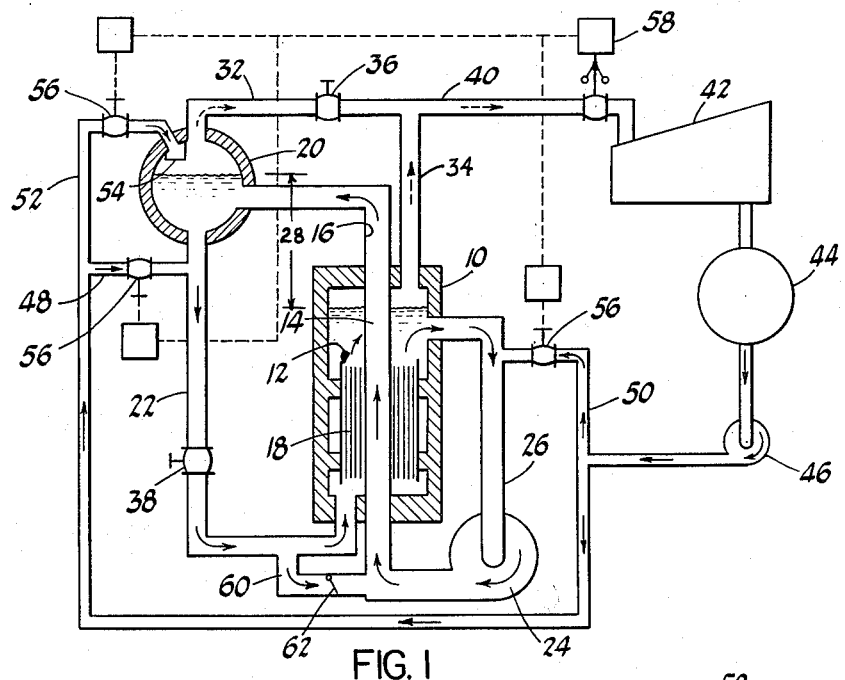
FIG. 1 is a schematic representation of a power plant system employing a boiling water nuclear reactor organized in accordance with the present invention.

Referring now to the drawing, wherein like reference characters are used throughout to designate like elements, the preferred and illustrative embodiment of the invention disclosed in FIG. 1 includes a reactor vessel 10 within which is mounted the core 12 of the boiling water reactor. This core preferably is comprised of a number of vertically elongated individually removable fuel assemblies each of which is made up of spaced vertically extending fuel rods about which the reactor coolant flows as it passes up through the core. As is well known, these assemblies are mounted in suitable grid plates at the upper and lower end of the core and they may be removed and replaced through the upper or lower end of the reactor vessel as desired. The reactor coolant, which is preferably either heavy or light water, although other vaporizable coolants may be employed if desired, is circulated through the reactor core with a portion of the coolant being vaporized as it traverses the core. It is intended that the term "water" as employed in this application includes any suitable coolant usable in a boiling reactor.

In accordance with the invention, as disclosed in FIG. 1, the circulating system for the reactor coolant is such that the coolant passes up through the central core region with the steam and water effluent emerging therefrom being separated and with the water thereafter passing through the outer core region. To accomplish this result the core is partitioned or divided into a central flow path 14 by means of the vertically extending duct or passageway 16 and an outer flow path 18 which is concentric with and disposed about the central core path. The outlet or upper end of passageway 16 is connected with steam and water drum 20 and extending down from this drum is the downcomer 22 which leads to the lower end of the core and communicates with the lower end of flow path 18. The lower end or inlet of passageway 16 is connected with the outlet of the circulating pump 24 with this pump having its inlet connected, through duct 26, with the upper region of reactor vessel 10.

Through this arrangement the circulating path is established whereby the reactor coolant is pumped from vessel 10 by pump 24 and up through the central flow path 14 into the steam and water drum 20. In traversing the central core region a portion of the coolant is vaporized so that the effluent from the core that is conveyed to drum 20 through duct 16 consists of a mixture of steam and water. Within the drum 20 the steam is separated from the water with the purpose of this drum being to act as a steam separator and with drum internals, if desired, being employed therewithin to effect this result as is well known in the steam generating art.

From drum 20 the water passes down through downcomer 22 and then up through the outer flow path 18 in the core with a portion of the water being evaporated as it passes up through the outer flow path or outer core region and with a steam and water mixture emerging from the upper end of this outer core region into the upper portion of the reactor vessel where the steam is separated from the water with the steam passing out through conduit 34 and the water returning to pump 24.

This flow through the outer core region is effected by natural circulation, i.e., the difference in density in the column of water in downtake 22 and the steam and water mixture in the outer flow path 18. This flow is also produced by the head 28 provided by elevating drum 20 above the reactor vessel. In addition to this driving head the pressure drop between the interior of drum 20 and the junction 30 of the steam outlet conduit 32 that extends from drum 20 and the steam outlet conduit 34 which extends up from the reactor vessel is effective to force water through the outer flow path 18 of the core. In some reactors it may be desirable to lower the drum 20 because of its effect on containment building height or because of the large amount of water that is stored in the pipes which extend to an elevated drum. If such lowering of the drum is desired the effect of a decrease in the head 28 may be offset by increasing the pressure drop between drum 20 and the junction 30 and this may be effected by providing any suitable restricting means in the pipe 32 such as an orifice or an adjustable valve 36.

It should be noted that the pressure drop between drum 20 and junction 30 will increase as the velocity of steam flowing from the drum and accordingly the power output of the central core portion increases. Since the central and outer core portions are coupled nuclearly an increase in power output of the central portion would be accompanied by a corresponding increase in the power output of the outer portion. The pressure drop in the outer core portion would increase as a result of the larger amount of steam produced. However the increased driving head due to the increased pressure drop in the steam line from the drum to junction 30 would approximately offset the increased flow resistance of the second pass or outer core region. Fine adjustments of water flow through the second pass may be effected by valve 38 so that the flow through the second pass may be made to match the desired flow as the power level changes.

Steam from conduits 32 and 34 is conveyed through conduit 40 to turbine 42 and from this turbine the steam is conveyed to a suitable condenser 44 with the condensate from this condenser being returned to the reactor system by the feedwater pump 46. From this feedwater pump the subcooled feedwater may be introduced into the reactor system so that it initially passes through the central core region or through the outer core region or it may be initially introduced into the steam region of drum 20. The control of the amounts of the subcooled feedwater introduced in these various regions will vary the power output of the reactor and accordingly may be used to control this power output. It is well known that the introduction of subcooled feedwater into the core of the boiling water reactor changes the boiling fraction in the core and accordingly changes the power level. An increase in power output is realized by increasing the amount of subcooled feedwater introduced into the core. In the multipass system of the present invention, since the central region of the core is operating in an area of greater neutron flux than the outer region, if the proportioning of the feedwater between the outer and the central core region is varied so as to increase the amount of subcooled feedwater that initially passes through the central core region and decrease that which initially passes through the outer core region, an increase in power output of the reactor will be realized. As the feedwater proportioning is varied in the opposite sense a decrease in power output of the reactor will be realized. By introducing the subcooled feedwater into the steam space in drum 20, this water will be heated to saturation temperature and since its subcooling will then be removed it will not cause an increase in power output of the reactor. Therefore as the proportioning of the feedwater is varied to increase that introduced into the steam space in drum 20 the power output of the reactor may be decreased.

In order to effect these results water from pump 46 may be introduced into downcomer 22 through conduit 48; may be introduced into conduit 26 leading to pump 24 by conduit 50; and may be introduced into the steam space in the drum 20 by conduit 52 and distributor 54. In each of the conduits 48, 50 and 52 there is provided a flow control valve 56 and each of these valves is controlled through the automatic control mechanism 58 which responds to the load on the turbine 42 with this mechanism 58 illustratively disclosed as responding to the turbine governor although any load responsive means may be employed. The control arrangement is such that the subcooled feedwater is proportioned between the three locations in a manner to control the power output of the reactor. To increase the power output of the reactor the feedwater proportioning is varied to increase that introduced through conduit 48 relative to that introduced ino the steam space in drum 20 and increase that introduced through conduit 50 relative to that introduced through conduit 48. A decrease in power is had by an opposite variation. The maximum power output will be produced when all the feedwater is delivered through conduit 50 while a minimum is produced when all the feedwater is introduced into the steam space. In addition to this control the reactor will be provided with conventional control rods which are not illustrated herein since their function and construction are well known.

By means of the organization of the present invention a positive or forced circulation is provided through the central region of the core and the drum 20 may be made sufficiently large to handle the function of separating the steam and water that emerges from this central core portion. The arrangement is such that an economical construction may be utilized in forming the flow path which extends up through the central core region and is connected at its upper end with drum 20 and at its lower end with the outlet of pump 24 with it only being necessary to provide a single large seal connection at the upper and lower ends of the core in order to form this flow path. With the multipass arrangement the pump 24 is required to handle much less water than it would otherwise have to handle if a forced circulation were provided for the entire core. This is an extremely important consideration when it is realized that 10 to 15 pounds of water must be circulated for each pound of steam produced in reactors of the boiling water type.

It is desirable to assure that an adequate flow through the central core region is provided for the short period during which the power level is decaying following a control rod scram resulting from an interruption of steam flow or an accident which causes a loss of operation of the pump 24. For this purpose there is provided a connection 60 between downcomer 22 and the outlet of pump 24. In this connection is mounted a check valve 62 which prevents flow from the outlet of pump 24 into downcomer 22 while permitting flow in the reverse direction. In normal operation the pressure differential across the valve will be such as to maintain it closed. However should the pump 24 cease to operate the valve will open and by means of natural circulation a flow of water from the downcomer up through the central flow path 14 will be provided.

Figure 2:
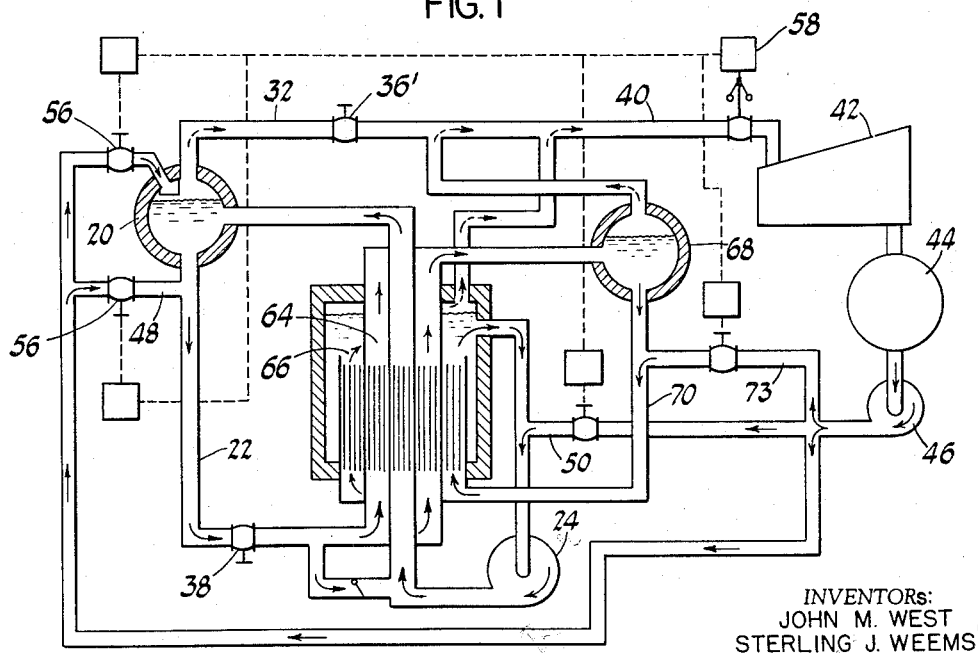
FIGS. 2, 3, 4 and 5 are similar to FIG. 1 but disclose several modifications of the organization of FIG. 1.
Figure 3:
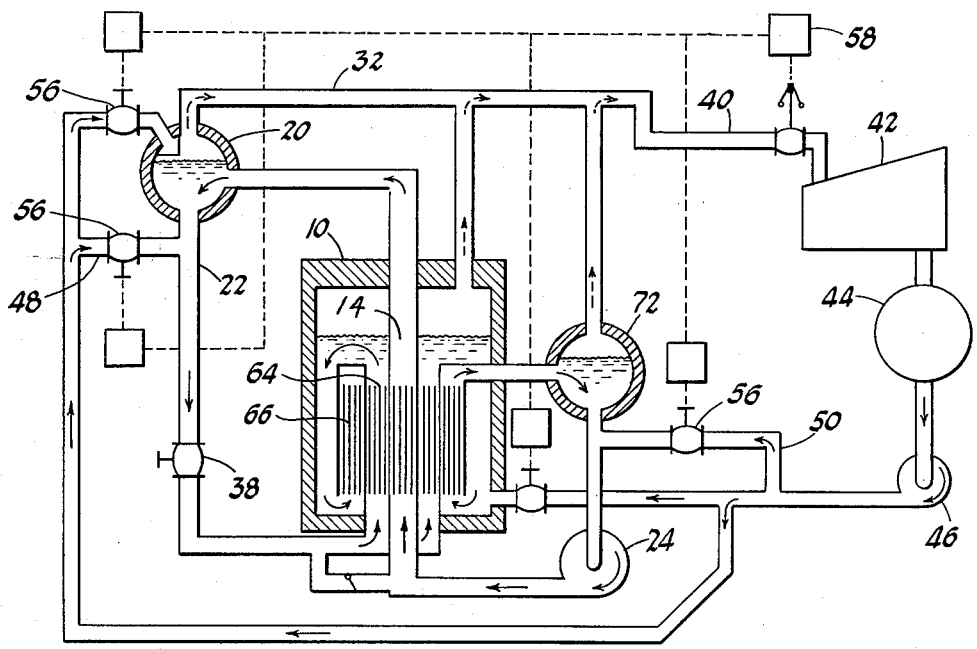

The organizations of FIGS. 2 and 3 are generally similar to that of FIG. 1 except that in lieu of a single pass through the outer core region this region of the core is divided into a plurality of passes. The FIG. 2 embodiment of the outer core region is divided into two flow paths 64 and 66 which are in internested concentric relation. Water from downcomer 22 passes up through the flow path 64 and the steam and water mixture passes from this flow path into the steam and water separating drum 68. From this drum water passes through the downcomer 70 to the outermost flow path 66 with this flow path corresponding with the outer flow path 18 in the embodiment of FIG. 1. The driving head for the second flow path 64 is that provided by the difference in density between the down- and uptake portions of the circulating system for this flow path as well as the difference in elevation of the drums 22 and 68. As in the case of the embodiment of FIG. 1 the driving heads for the outer flow paths 64 and 66 may be supplemented by pressure drops between drum 22 and the connection of the steam outlet for each of these flow paths with the conduit leading to the turbine. Valves 36 may be provided to adjust this pressure dropping as desired.

While the outer region of the core in the FIG. 2 embodiment has been partitioned into only two serially connected flow paths, it will be appreciated that this number can be increased as desired.

FIG. 3 differs from FIG. 2 in that the second annular concentric flow path opens at its upper end to the interior of the reactor pressure vessel rather than the third flow path so opening into the vessel. In the embodiment of FIG. 3 the third flow path 66 is connected with the steam and water drum 72 from which water is supplied to the circulating pump 24 for passage up through the central flow path 14.

Both of the embodiments in FIGS. 2 and 3 can be used in very large reactors in which the amount of steam generating in the second paths in an arrangement such as FIG. 1 is too great for efficient steam and water separation to take place in the upper part of the pressure vessel. By dividing the second paths into a plurality of passes and separating the effluent from each pass this problem of handling the steam and water mixture is alleviated.

It will be appreciated that the same control with regard to the introduction of feedwater for initial passage through the various pasageways and into the steam space in the drum is achieved in these FIGS. 2 and 3 embodiments as in the FIG. 1 embodiment. However since there is an additional flow path there is an additional location for feedwater introduction, with the feedwater being introduced into the outermost path through conduit 73.

It will be noted that by having the second concentric flow path open into the interior of the reactor vessel the embodiment of FIG. 3 has only two external loops while the embodiment of FIG. 2 has three such loops. In certain environments this may be a decided economic advantage. However it should be pointed out that it is a somewhat more costly construction to provide a plenum chamber at the upper end of the outermost flow path 66 as in FIG. 3 to connect this flow path with a steam and water drum than it is with the second flow path 64 as in the embodiment of FIG. 2.

Figure 4:
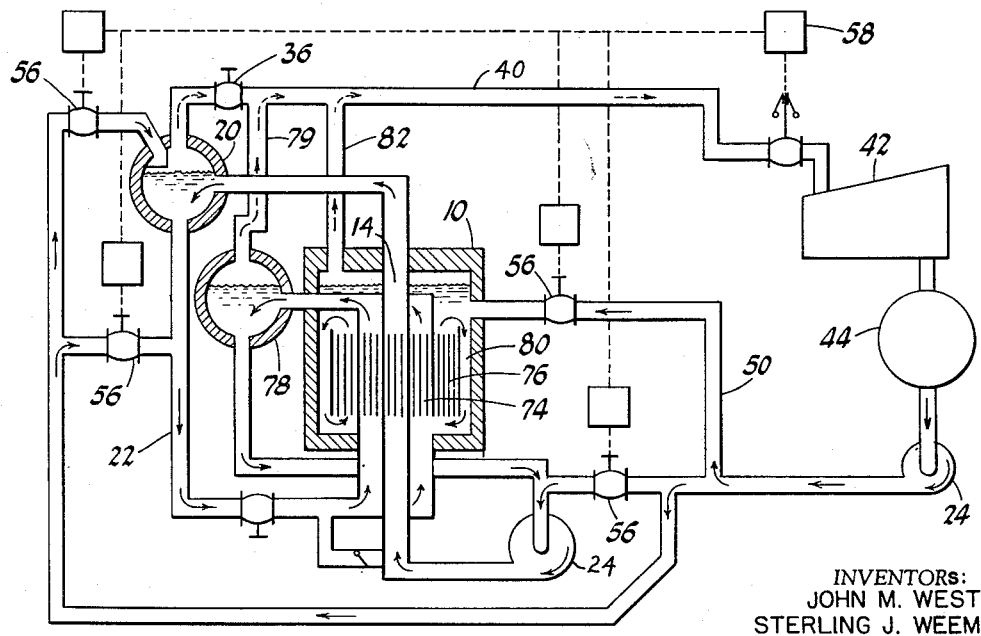

The organization of FIG. 4 differs from the embodiments of FIGS. 1, 2 and 3 in that all three of the separate flow paths through the reactor core are not in series flow relation. In the embodiment of FIG. 4 the core is divided into a central flow path or region 14 and two concentric annular flow paths 74 and 76 disposed thereabout. The circulation system is such that water flows from pump 24 up through the central flow path 14 to drum 20 and from this drum 20 down through downcomer 22 and up through the second flow path 74 as in the embodiment of FIG. 1. From this second flow path the water and steam mixture are directed to steam and water drum 78 wherein the steam is separated from the water with the water being conveyed from this drum to the inlet of drum 24 and the steam being directed to conduit 40 through connecting conduit 79. Accordingly the central flow path 14 and the second flow path 74 in the reactor core are in series flow relation. The annular flow path 76 disposed about flow path 74 is open at its upper and lower ends to the interior of the reactor pressure vessel 10. Disposed about this flow path 76 is an annular downcomer 80 which is the space between the flow path and the interior of the pressure vessel and accordingly water circulates down through this downcomer 80 and up through the outer flow path 76 with this, of course, being a natural circulation. Steam is conveyed from the reactor pressure vessel through conduit 82 to the distribution conduit 40 that leads to the steam turbine. This arrangement takes advantage of the fact that the outermost region of the core is the region of the lowest power density and accordingly the natural convection with a relatively low circulating head is adequate for cooling this portion of the reactor with the arrangement providing a simple and economic construction.

Figure 5:
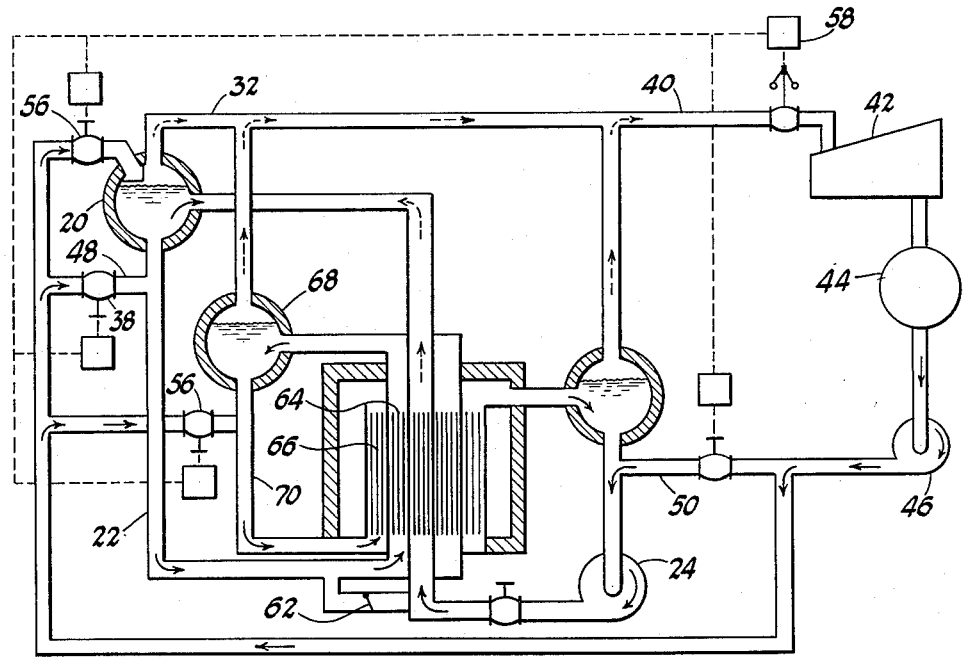

The organization of FIG. 5 is similar to that of FIG. 2 except that in this modified embodiment there is no steam and water separation in the pressure vessel with each of the three flow paths through the core having its outlet connected with a steam and water drum located exteriorly of the pressure vessel. This enables the designer to insure that adequate provision for steam and water separation of the mixtures for each of the several core areas is provided. Large quantities of steam are sometimes difficult to handle within the reactor vessel itself while the steam and water drums may be adequately designed to handle the necessary volumes that may be encountered.

Figure 6:
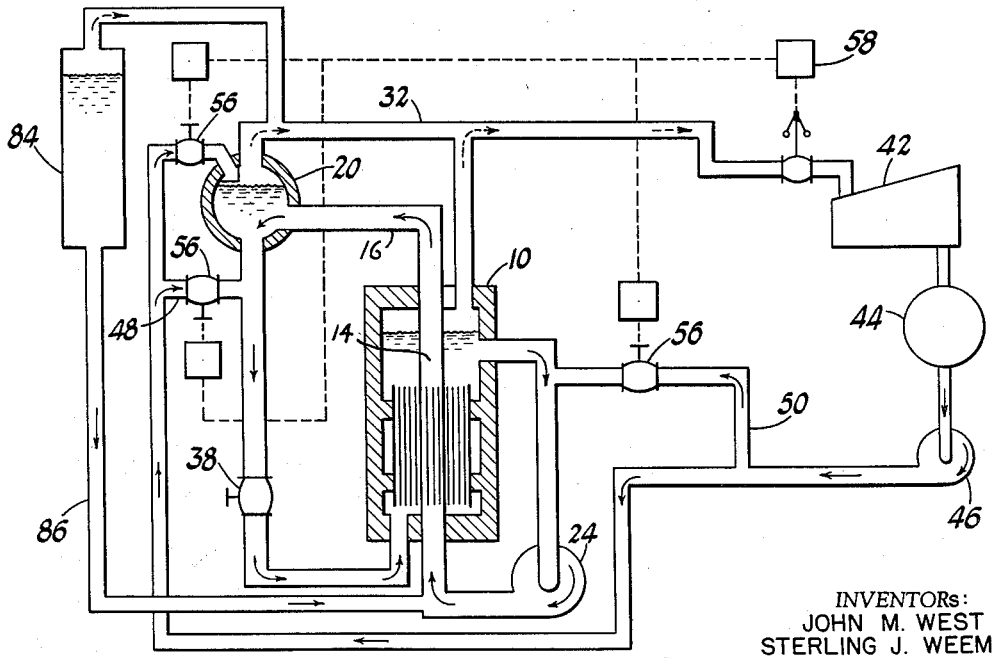
FIG. 6 is a schematic representation also similar to FIG. 1 but showing a different arrangement for assuring flow through the central region of the core in the event of a pump failure.

In lieu of providing the valved connection 60 to insure that the necessary flow of coolant to the central region or flow path 14 of the core will be provided while the power level is decaying following scram of the control rods and a stoppage of circulating pump 24 the arrangement disclosed in FIG. 6 may be utilized. In this arrangement a reservoir of water 84 is disposed at a suitable elevation and is connected through conduit 86 with the outlet of pump 24 so that the head of water produced by the reservoir 84 and conduit 86 is sufficient to balance the outlet pressure of the pump 24. The upper end of reservoir 84 is connected to the steam outlet conduit 32 extending from drum 20. With this arrangement the water in reservoir 84 will normally be retained in its elevated position as disclosed in FIG. 6 while pump 24 is in operation. However should the pump cease to operate for any reason this reservoir of water will be effective to provide a flow through the central flow path 14 of the core for a short period giving the power level sufficient time to decay following a scram of the control rods.

While we have illustrated and described preferred embodiments of our invention it is to be understood that these are merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. A boiling water nuclear reactor system including an upright core disposed in a pressure vessel, a system for circulating cooling water through the core including means providing separate passageways through the core which are in serial flow relation with regard to the flow of the coolant with one such passageway extending up through a central region thereof, separate means receiving a steam and water mixture from each passageway so that each passageway has its respective receiving means and wherein a separation of the mixture takes place, said passageway extending through the central region having its outlet connected with a steam and water drum located exteriorly of the pressure vessel for this purpose, means for conveying water from said drum for passage through other of said passageways, pump means connected to force said cooling water through the central passageway, and means conveying steam from the separate means to a point of use.

2. A boiling water nuclear reactor system including an upright core disposed in a pressure vessel, a system for circulating cooling water through the core including means providing separate passageways through the core which are in serial flow relation with regard to the flow of the coolant with one such passageway extending up through a central region thereof, separate means receiving a steam and water mixture from each passageway so that each passageway has its respective receiving means and wherein a separation of the mixture takes place, said passageway extending through the central region having its outlet connected with a steam and water drum located exteriorly of the pressure vessel for this purpose, means for conveying water from said drum for passage through other of said passageways, pump means connected to force said cooling water through the central passageway, means separate from the pump means connected with the inlet of the central passageway to supply water thereto, this last named means being rendered inactive by the normal outlet pressure developed by the pump but being effective to supply water to said passageway upon the pump pressure being lowered to a predetermined value.

3. A boiling water nuclear reactor system including an upright core disposed in a pressure vessel, a system for circulating cooling water through the core including means providing separate passageways through the core which are in serial flow relation with regard to the flow of the coolant with one such passageway extending up through a central region thereof, separate means receiving a steam and water mixture from each passageway so that each passageway has its respective receiving means and wherein a separation of the mixture takes place, said passageway extending through the central region having its outlet connected with a steam and water drum located exteriorly of the pressure vessel for this purpose, means for conveying water from said drum for passage through other of said passageways, pump means connected to force said cooling water through the central passageway, a reservoir of water communicating with the inlet of the central passageway and in opposing relation with the outlet pressure developed by the pump with the elevation thereof being such that the pressure developed thereby equals the pressure developed by the pump in normal operation.

4. A boiling water nuclear reactor system including an upright core disposed in a pressure vessel, a system for circulating cooling water through the core including means providing separate passageways through the core which are in serial flow relation with regard to the flow of the coolant with one such passageway extending up through a central region thereof, separate means receiving a steam and water mixture from each passageway so that each passageway has its respective receiving means and wherein a separation of the mixture takes place, said passageway extending through the central region having its upper end connected with a steam and water drum located exteriorly of the pressure vessel, means for conveying water from said drum for passage through other of said passageways, pump means connected with the lower end of said central passageway for forcing cooling water upwardly therethrough, means establishing communication between the outlet of the pump means and the lower region of the steam and water drum for the flow of water from said drum into said outlet, and valve means preventing flow in the opposite direction.

5. A boiling water nuclear reactor having a core that is divided into a number of separate regions from the center outwardly with each region extending through the core and forming a flow passageway therethrough separate from the others, a fluid distribution system operative to convey water coolant through the separate flow passageways and including a pump having its outlet communicating solely with the central most passageway to force water therethrough, other means for passing water through said central most passageway, this last means being ineffective to cause water to pass through said central passageway when the pump pressure forcing the water therethrough is above a predetermined value and effective to cause the water to so flow when the pump pressure falls below said predetermined value.

6. The organization of claim 5 wherein said other means comprising a water reservoir elevated with respect to the inlet of the central flow passageway and communicating therewith.

7. The organization of claim 5 including means for receiving the effluent of steam and water from the central most passage and in which the steam is separated from the water, said means having a water space, and wherein said other means includes means connecting the water space in this receiving means with the entrance of the central most passageway and means permitting flow through this connecting means from the receiving means to the entrance of the central most passageway but preventing a reverse flow.

8. A boiling water nuclear reactor having an upright core disposed within a suitable vessel, means forming a flow path extending centrally up through the core separate from the remaining outer core portion, an inlet means and an outlet means connected with and forming a continuation of said flow path and separate from the remaining outer core portion and extending exteriorly of the vessel, a pump having its outlet connected with said inlet means to force water through the flow path, a steam and water drum connected with said outlet means to receive a steam and water mixture therefrom and separate the steam from the water whereby a forced flow of water through the central region is provided separate from the other core regions, and means conveying water from said drum through other portions of the core.

9. A boiling water nuclear reactor having an upright core disposed within a suitable vessel, means forming a flow path extending centrally up through the core separate from the remaining outer core portion, an inlet means and an outlet means connected with and forming a continuation of said flow path and separate from the remaining outer core portion and extending exteriorly of the vessel, a pump having its outlet connected with said inlet means to force water through the flow path, a steam and water drum connected with said outlet means to receive a steam and water mixture therefrom and separate the steam from the water whereby a forced flow of water through the central region is provided separate from the other core regions, the outer core region being partitioned into additional flow paths in internested relation and concentric with the central flow path, means conveying water from said drum, up through one of the flow paths in the outer region, and separate means receiving the steam and water effluent from each of said additional flow paths so that each such additional flow path has its respective receiving means and effective to separate the steam from the water.

10. A boiling water nuclear reactor having an upright core disposed within a suitable vessel, means forming a flow path extending centrally up through the core separate from the remaining outer core portion, an inlet means and an outlet means connected with and forming a continuation of said flow path and separate from the remaining outer core portion and extending exteriorly of the vessel, a pump having its outlet connected with said inlet means to force water through the flow path, a steam and water drum connected with said outlet means to receive a steam and water mixture therefrom and separate the steam from the water whereby a forced flow of water through the central region is provided separate from the outer core regions, the outer core region being partitioned into additional flow paths in internested relation and concentric with the central flow path, the several flow paths in the core being in serial flow relation and a separate steam and water drum exteriorly of the vessel to receive the steam and water effluent from each separate path so that each such separate path has its respective steam and water drum and wherein the steam is separated from the water.

11. A boiling water nuclear reactor having an upright core disposed within a suitable vessel, means forming a flow path extending centrally up through the core separate from the remaining outer core portion, an inlet means and an outlet means connected with and forming a continuation of said flow path and separate from the remaining outer core portion and extending exteriorly of the vessel, a pump having its outlet connected with said inlet means to force water through the flow path, a steam and water drum connected with said outlet means to receive a steam and water mixture therefrom and separate the steam from the water whereby a forced flow of water through the central region is provided separate from the outer core regions, the outer core region being partitioned into additional flow paths in internested relation and concentric with the central flow path, the several flow paths in the core being in serial flow relation, the path adjacent the innermost path being open at its upper end to the vessel interior, and the remaining paths communicating at their upper end with separate steam and water drums exteriorly of the vessel so that each such remaining path has its respective steam and water drum.

12. A boiling water nuclear reactor having an upright core disposed within a suitable vessel, means forming a flow path extending centrally up through the core separate from the remaining outer core portion, an inlet means and an outlet means connected with and forming a continuation of said flow path and separate from the remaining outer core portion and extending exteriorly of the vessel, a pump having its outlet connected with said inlet means to force water through the flow path, a steam and water drum connected with said outlet means to receive a steam and water mixture therefrom and separate the steam from the water whereby a forced flow of water through the central region is provided separate from the other core regions, the outer core region being partitioned into additional flow paths in internested relation and concentric with the central flow path, means conveying water from said drum, up through one of the flow paths in the outer region, the outermost flow path being open at its upper end to the vessel interior with the upper region of the vessel acting as a steam and water separator for the effluent from the outer region, separate means exterior of the vessel connected to receive the steam and water effluent from the other additional flow paths so that each such additional path has its respective steam and water drum.

13. A boiling water nuclear reactor having an upright core disposed within a suitable vessel, means forming a flow path extending centrally up through the core separate from the remaining outer core portion, an inlet means and an outlet means connected with and forming a continuation of said flow path and separate from the remaining outer core portion and extending exteriorly of the vessel, a pump having its outlet connected with said inlet means to force water through the flow path, a steam and water drum connected with said outlet means to receive a steam and water mixture therefrom and separate the steam from the water whereby a forced flow of water through the central region is provided separate from the other core regions, the outer core region being partitioned into additional flow paths in internested relation and concentric with the central flow path, the outermost flow path being open at its upper and lower ends to the vessel, downcomer means interconnecting said open ends to establish a natural circulation path that includes the outermost flow path, the other flow paths in the outer core region being in serial flow relation with each having separate steam and water separating means exterior of the vessel so that each such other flow path has its respective steam and water separating means, and means conveying water to one of said other flow paths from the steam and water drum with which the outlet means of the central flow path is connected.

14. A boiling water nuclear reactor comprising an upright core partitioned into a central region and an outer region and mounted in a pressure vessel, means conveying a steam and water effluent from the central region to a drum exteriorly of the vessel where the steam is separated from the water, means conveying water from said drum up through said outer core region, the steam and water effluent from this outer core region being discharged to the vessel interior where a separation of the steam from the water is effected, means conveying steam from said drum and said vessel to a point of use, and pump means operative to pump water discharged from the outer core region up through the central core region.

15. The organization of claim 14 wherein means is provided to convey water from the drum up through the central core region, said means being subjected to the outlet pressure of the pump, valve means permitting flow from said drum up through the central core region but preventing reverse flow.

16. A boiling water nuclear reactor comprising an upright core partitioned into a central region and a pair of outer regions and mounted in a pressure vessel, a first steam and water drum exteriorly of said vessel, means conveying a steam and water effluent from the central core region to said drum where the steam is separated from the water, means operative to serially and subsequently convey water from said drum up through one of said outer regions, up through the other of said outer regions and up through said central region back to said drum, said means including pump means for forcing said fluid up through said central region, one of said outer regions discharging its steam and water effluent into the vessel interior where separation of the steam from the water is effected and means conveying the steam and water effluent from the other outer region to a second steam and water drum exteriorly of the vessel where separation of the steam and water is achieved.

17. The organization of claim 16 wherein the outer core region discharging its steam and water effluent to said second drum is connected to receive water from said first drum and said outer core region which discharges effluent to the vessel interior receives water from said second drum, the pump having its inlet connected with the vessel interior to receive water therefrom.

18. The organization of claim 16 wherein said outer core region which discharges its effluent to the vessel interior is connected to receive water from said first drum and said outer core region which discharges its effluent to said second steam and water drum receives water after its traversal of the core region which discharges its effluent to the vessel interior, the inlet of said pump means being connected with the lower region of said second steam and water drum.

References Cited by the Examiner
UNITED STATES PATENTS

| | | | |
|---|---|---|---|
| 2,806,820 | 9/57 | Wigner | 176—54 |
| 2,938,845 | 5/60 | Treshow | 176—54 |
| 2,957,815 | 10/60 | Pacult et al. | 60—108 |
| 2,986,508 | 5/61 | Vernon | 176—44 |
| 2,998,367 | 8/61 | Untermyer | 176—56 |
| 3,042,600 | 7/62 | Brooks | 176—20 |

FOREIGN PATENTS

| | | |
|---|---|---|
| 219,722 | 1/59 | Australia. |
| 1,190,224 | 2/59 | France. |
| 1,198,728 | 12/59 | France. |
| 729,171 | 3/58 | Great Britain. |
| 799,725 | 8/58 | Great Britain. |

OTHER REFERENCES

German printed application 1,027,338 April 1958.
German printed application 1,051,425 February 1959.

CARL D. QUARFORTH, *Primary Examiner.*
REUBEN EPSTEIN, *Examiner.*